United States Patent
Feng

(10) Patent No.: US 10,329,116 B2
(45) Date of Patent: Jun. 25, 2019

(54) SENSING APPARATUS FOR YARN FEEDER

(71) Applicant: Shen-Te Feng, Changhua (TW)

(72) Inventor: Shen-Te Feng, Changhua (TW)

(73) Assignee: Sunshine Kinetics Technology Co. Ltd., Taichung (TW)

( * ) Notice: Subject to any disclaimer, the term of this patent is extended or adjusted under 35 U.S.C. 154(b) by 159 days.

(21) Appl. No.: 15/665,262

(22) Filed: Jul. 31, 2017

(65) Prior Publication Data
US 2019/0032253 A1     Jan. 31, 2019

(51) Int. Cl.
| | |
|---|---|
| *G01L 5/04* | (2006.01) |
| *G01L 5/10* | (2006.01) |
| *B65H 59/38* | (2006.01) |
| *B65H 59/40* | (2006.01) |
| *D03D 49/16* | (2006.01) |
| *D03D 49/18* | (2006.01) |

(52) U.S. Cl.
CPC ........... *B65H 59/40* (2013.01); *B65H 59/387* (2013.01); *D03D 49/16* (2013.01); *D03D 49/18* (2013.01); *G01L 5/04* (2013.01); *G01L 5/107* (2013.01); *B65H 2701/31* (2013.01)

(58) Field of Classification Search
CPC .. B65H 59/40; B65H 59/387; B65H 2701/31; G01L 5/04; G01L 5/107; D03D 49/16; D03D 49/18
See application file for complete search history.

(56) References Cited

U.S. PATENT DOCUMENTS

| | | | | |
|---|---|---|---|---|
| 4,530,471 A | * | 7/1985 | Inoue | B23H 7/10 219/69.12 |
| 6,079,656 A | * | 6/2000 | Schmodde | B65H 59/40 242/365.7 |
| 6,105,895 A | * | 8/2000 | Schmodde | B65H 59/40 242/420.6 |
| 9,994,420 B2 | * | 6/2018 | Bewley, Jr. | B65H 59/382 |

FOREIGN PATENT DOCUMENTS

DE        4114297 A1 * 11/1992        A46D 3/042

* cited by examiner

*Primary Examiner* — William E Dondero
(74) *Attorney, Agent, or Firm* — Che-Yang Chen; Law Offices of Scott Warmuth

(57) ABSTRACT

A sensing apparatus for yarn feeder may comprise a yarn feeder and a tension controller. The tension controller has an elongated sensing block installed therein, and a horizontal extending board is connected to the sensing block. An operating rod is mounted on a middle upper surface of the extending board at one end and upwardly sticks out of the tension controller to pivotally connect to a tension pulley at the other end. A yarn wound on a winding wheel of the yarn feeder is configured to couple with the tension pulley. At least an impedance sensing piece is attached on a surface of the sensing block, and a deformable hole horizontally penetrates through the sensing block. When the sensing block is pressed or pulled, the tension controller can obtain the tension value of the yarn and further calculate the torsion value of the yarn feeder.

6 Claims, 6 Drawing Sheets

US 10,329,116 B2

SENSING APPARATUS FOR YARN FEEDER

FIELD OF THE INVENTION

The present invention relates to a sensing apparatus, and more particularly to a low-cost sensing apparatus that is configured to automatically control the rotational speed of a yarn feeder.

BACKGROUND OF THE INVENTION

Generally, a conventional yarn feeder has a winding wheel secured on a shaft, and an end of the shaft is pivotally connected to a frame while a body portion thereof is connected to a rim. Moreover, the rim is connected to a driving motor through a belt member such that the driving motor can drive the winding wheel to achieve the weaving processing. Moreover, in actual application, the weaving process needs a hundred of yarns weaved together at a time, and the yarns have to keep the same tension and extraction speed so as to produce high-quality weaving product.

However, the conventional yarn feeder is disadvantageous because: (i) the yarns are configured to be driven by a plurality of pulleys simultaneously, and the pulleys are further used for controlling the rotational speed of the yarns, which cannot precisely control tension and extraction speed of every yarn; and (ii) the driving motor can only indirectly drive the winding wheel through the belt member, and, for a period of time, the belt member is prone to be worn and have idling of transmission, which leads the imprecise in rotational speed control of the yarn feeder and in controlling the tension of yarn. Therefore, there remains a need for a new and improved design for a sensing apparatus for yarn feeder to overcome the problems presented above.

SUMMARY OF THE INVENTION

The present invention provides a sensing apparatus for yarn feeder which comprises a yarn feeder and a tension controller. The tension controller has an elongated sensing block installed therein which comprises a first lateral end and a second lateral end, and the first lateral end is secured on the tension controller to enable the second lateral end to be suspended. A horizontal extending board is connected to an upper portion of the second lateral end at one end to enable the other end thereof to be suspended between the first lateral end and an upper end of the tension controller. An operating rod is mounted on a middle upper surface of the extending board at one end and upwardly sticks out of the tension controller to pivotally connect to a tension pulley at the other end. A yarn wound on a winding wheel of the yarn feeder is configured to couple with the tension pulley. At least an impedance sensing piece is attached on a surface of the sensing block, and a deformable hole horizontally penetrates through the sensing block. When the tension pulley is pressed by the yarn to press the sensing block, the deformable hole is configured to have slight deformation and the impedance sensing piece is bent to enable the tension controller to obtain the tension value of the yarn and further calculate the torsion value of the yarn feeder. The tension controller further comprises a first locating block and a second locating block installed therein. Also, the first locating block is located beneath the second lateral end of the sensing block to form a lower shifting gap therebetween while the second locating block is located above the extending board close to the first lateral end to form an upper shifting gap therebetween, and the lower shifting gap and the upper shifting gap have the same height.

In one embodiment, the tension controller further has two fixed rods respectively located at two lateral sides of the operating rod, and each of the fixed rods is pivotally connected to a grooved wheel, and the two grooved wheels are configured to guide the yarn to firmly couple with the tension pulley.

In another embodiment, the lower shifting gap and the upper shifting gap have the same height which is 0.05 mm.

In still another embodiment, the impedance sensing piece of the tension controller is electrically connected to an electronic control board and a control panel which are configured to automatically control the rotational torque of the yarn feeder and to display the status of setting and control of the tension controller respectively.

In a further embodiment, the yarn feeder has a shaft axially penetrating through a driver and the winding wheel, and the driver and the winding wheel are connected to have rotation synchronously; the electronic control board is electrically connected to the driver.

In still a further embodiment, a plurality of arc-shaped elastic strips are arranged around the winding wheel, and each of the elastic strips has two ends respectively connected to two ends of the winding wheel; the yarn is wound on the winding wheel to form a yarn roll, and the elastic strips are configured to abut against an inner periphery of the yarn roll.

Comparing with conventional yarn feeder, the present invention is advantageous because: (i) the tension controller can automatically and directly control the driver to keep the torque or rotational speed of the yarn feeder in a preferred value, thereby improving the weaving quality and yield; (ii) the impedance sensing piece attached on the surface of the sensing block is configured to have synchronous deformation with the sensing block, and according to the variation of electrical resistance of the impedance sensing piece, the tension controller can obtain the precise tension value of the yarn; and (iii) the lower shifting gap and the upper shifting gap have the same height, which limits the maximum deformation of the sensing block and further protects the tension controller from damage.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

Figure 1:
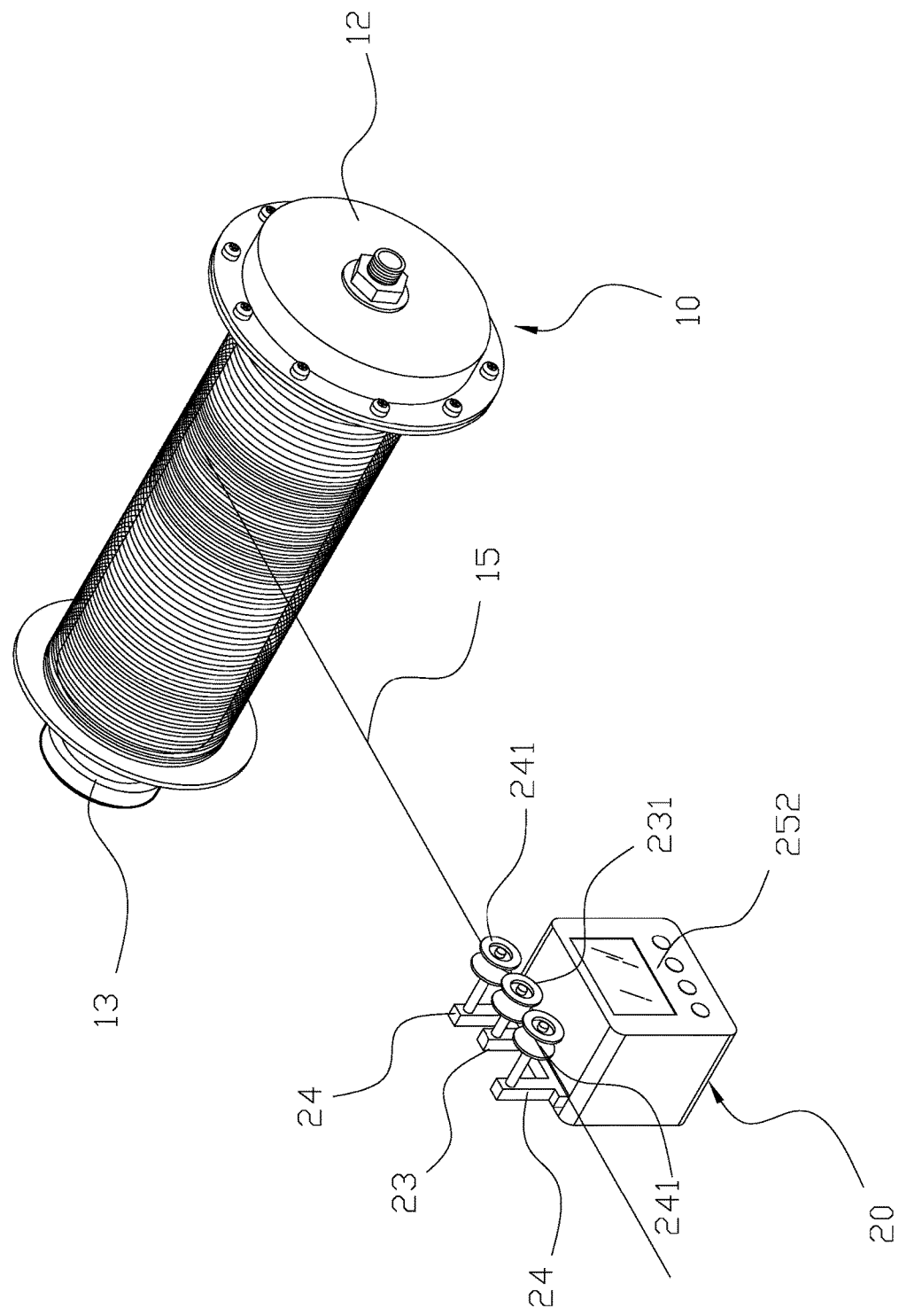
FIG. 1 is a three-dimensional assembly view of a sensing apparatus for yarn feeder in the present invention.
Figure 2:
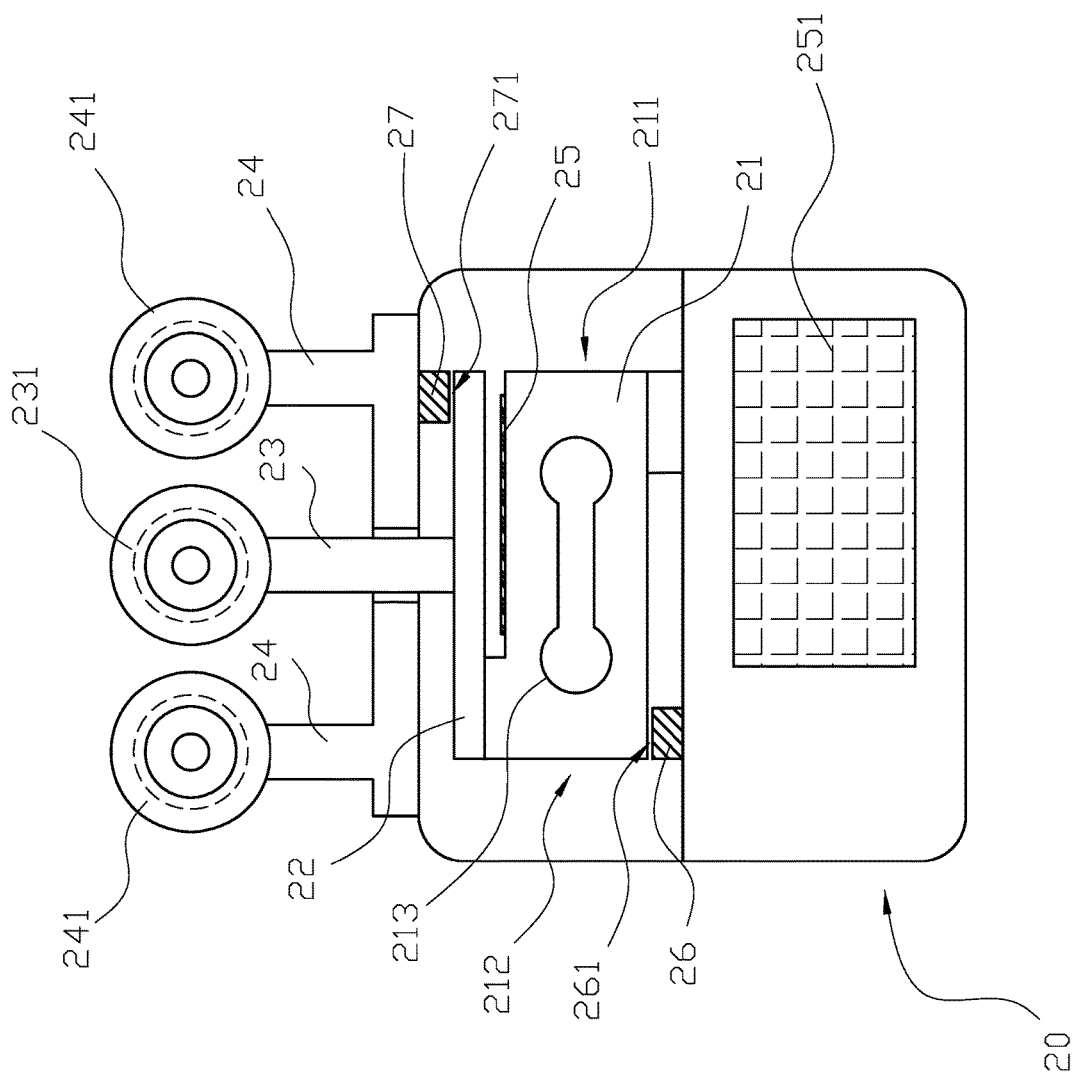
FIG. 2 is an internal perspective view of a tension controller of the sensing apparatus for yarn feeder in the present invention.
Figure 3:
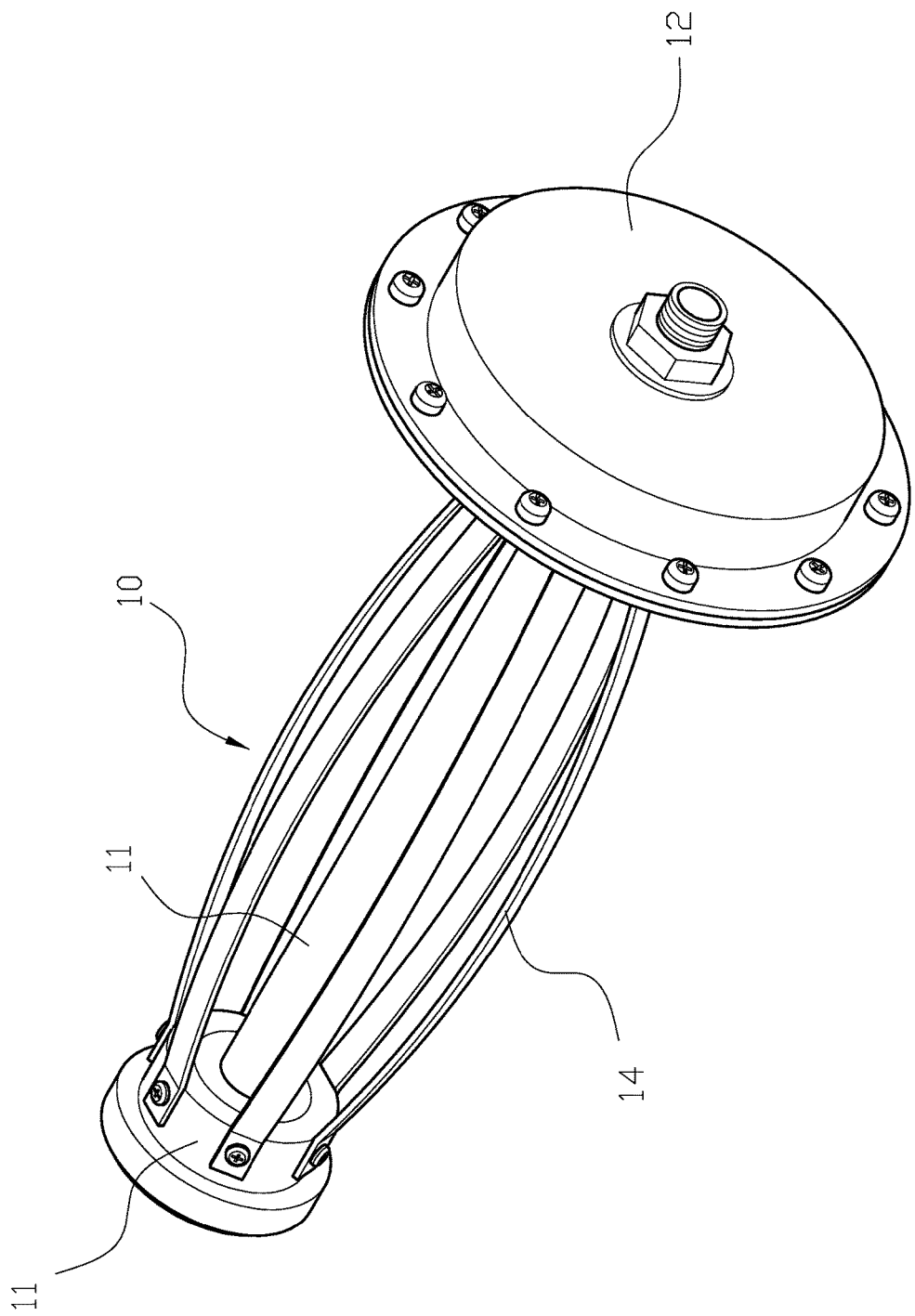
FIG. 3 is a three-dimensional assembly view of a yarn feeder of the sensing apparatus for yarn feeder in the present invention.
Figure 4:
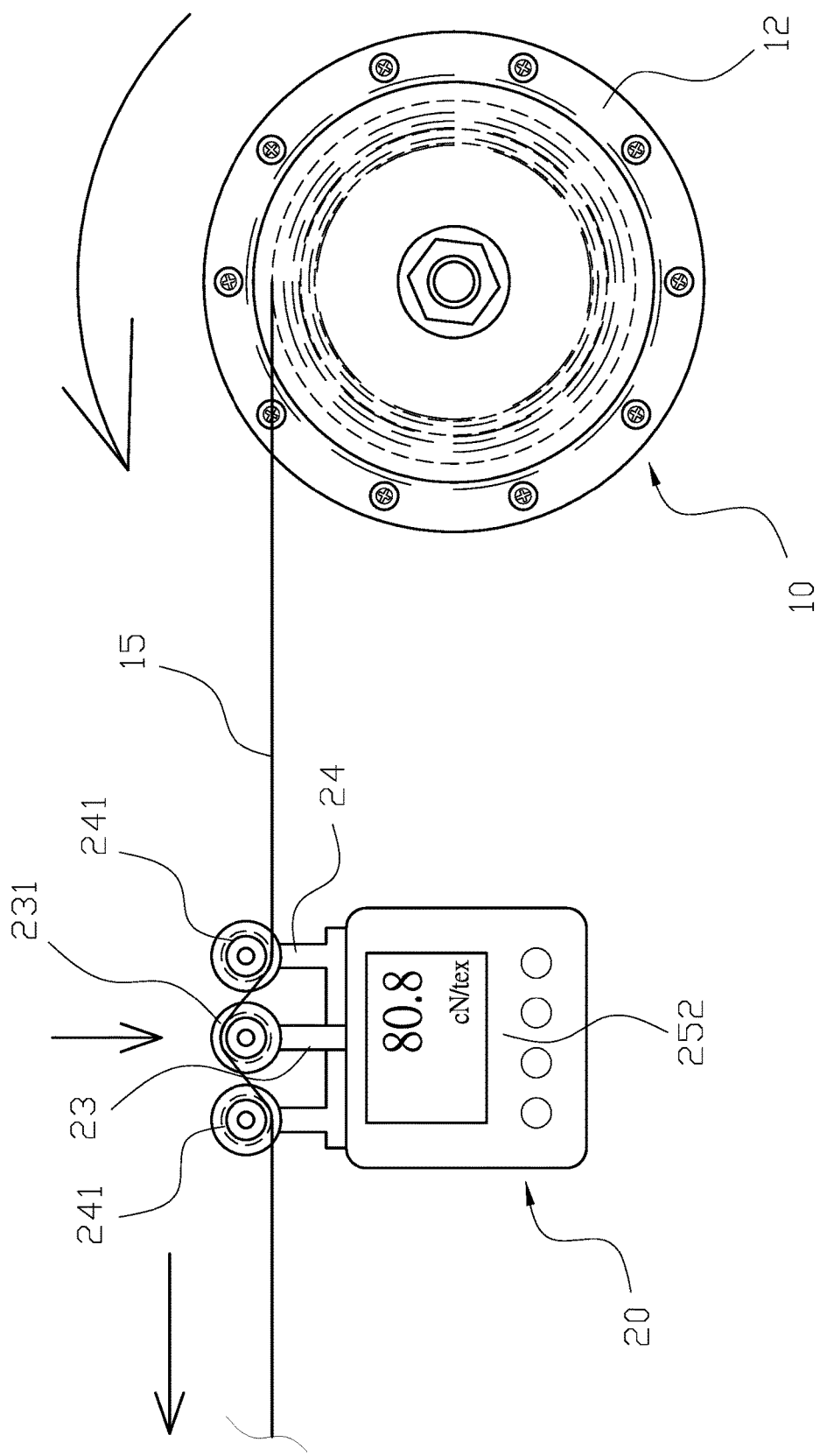
FIG. 4 is a schematic view of the sensing apparatus for yarn feeder of the present invention when in use.
Figure 5:
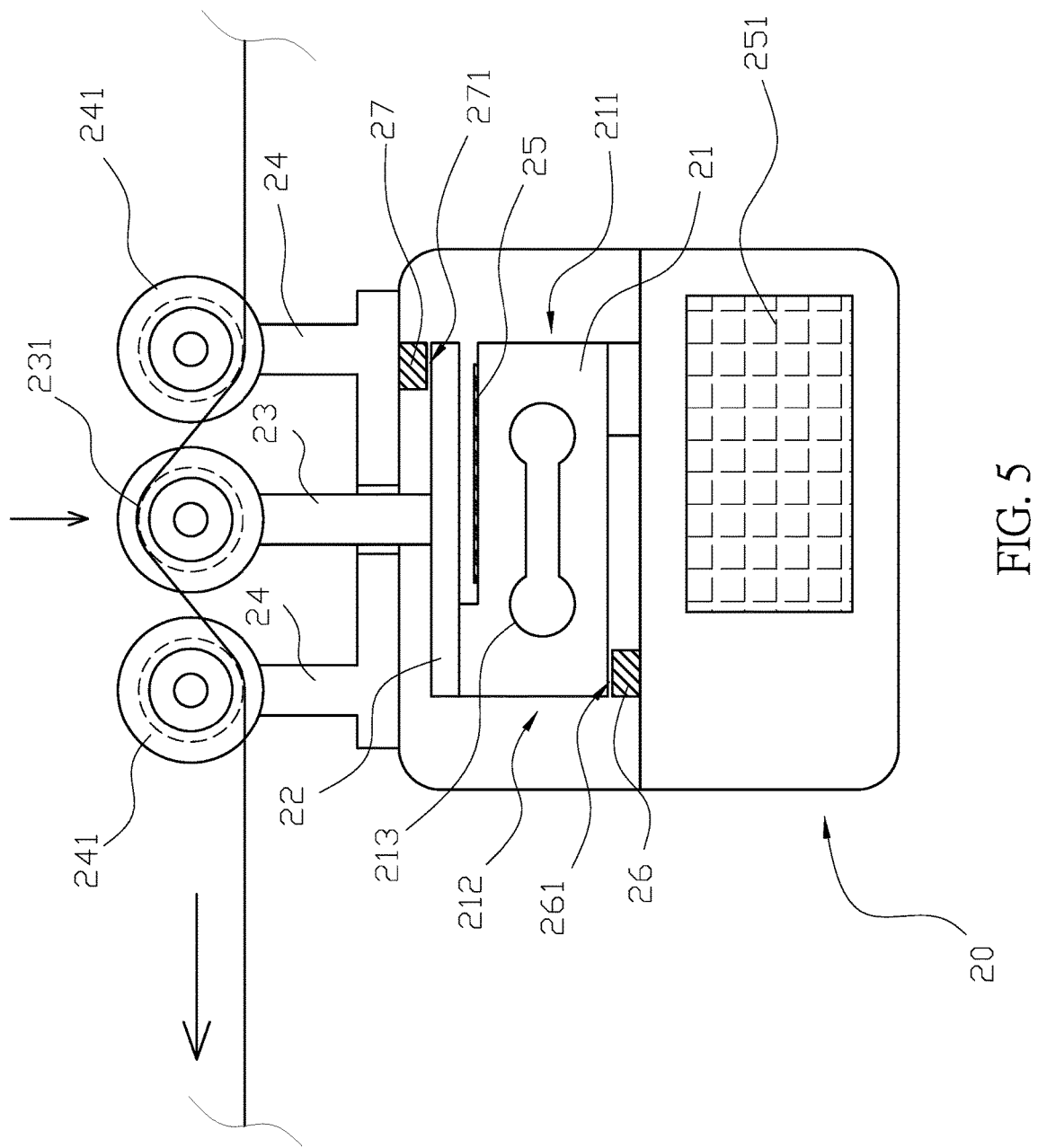
FIG. 5 is another schematic view of the sensing apparatus for yarn feeder of the present invention when in use.

In order to further understand the goal, characteristics and effect of the present invention, a number of embodiments along with the drawings are illustrated as following:

Referring to FIGS. 1 to 3, the present invention provides a sensing apparatus for yarn feeder which comprises a yarn feeder (10) and a tension controller (20). The yarn feeder (10) has a shaft (11) axially penetrating through a driver (12) and a winding wheel (13), and the driver (12) and the winding wheel (13) are connected to have rotation synchronously. Moreover, a plurality of arc-shaped elastic strips (14) are arranged around the winding wheel (13), and each of the elastic strips (14) has two ends respectively connected to two ends of the winding wheel (13). The tension controller (20) has an elongated sensing block (21) installed therein which comprises a first lateral end (211) and a second lateral end (212), and the first lateral end (211) is secured on the tension controller (20) to enable the second lateral end (212) to be suspended. Furthermore, a horizontal extending board (22) is connected to an upper portion of the second lateral end (212) at one end to enable the other end thereof to be suspended between the first lateral end (211) and an upper end of the tension controller (20). Additionally, an operating rod (23) is mounted on a middle upper surface of the extending board (22) at one end and upwardly sticks out of the tension controller (20) to pivotally connect to a tension pulley (231) at the other end. A yarn (15) is wound on the winding wheel (13) to form a yarn roll, and the elastic strips (14) are configured to abut against an inner periphery of the yarn roll such that the winding wheel (13) can firmly drive the yarn roll to have synchronous rotation. The tension controller (20) further has two fixed rods (24) respectively located at two lateral sides of the operating rod (23), and each of the fixed rods (24) is pivotally connected to a grooved wheel (241). Moreover, the two grooved wheels (241) are respectively located at two lateral sides of the tension pulley (231), and the yarn (15) is configured to sequentially and simultaneously couple with a lower portion of one grooved wheel (241), an upper portion of the tension pulley (231) and a lower portion of the other grooved wheel (241) to pass through the tension controller (20). At least an impedance sensing piece (25) is attached on a surface of the sensing block (21), and a deformable hole (213) horizontally penetrates through the sensing block (21). When the tension pulley (231) is pressed downwardly by the yarn (15) to press the sensing block (21), the deformable hole (213) is configured to have slight deformation and the impedance sensing piece (25) is bent to enable the tension controller (20) to obtain the tension value of the yarn (15) and further calculate the torsion value of the yarn feeder (10). In addition, the impedance sensing piece (25) of the tension controller (20) is electrically connected to an electronic control board (251) and a control panel (252) which are configured to automatically control the rotational torque of the yarn feeder (10) and to display the status of setting and control of the tension controller (20) respectively. Furthermore, the electronic control board (251) is electrically connected to the driver (12), and the tension controller (20) further comprises a first locating block (26) and a second locating block (27) installed therein. The first locating block (26) is located beneath the second lateral end (212) of the sensing block (21) to form a lower shifting gap (261) therebetween while the second locating block (27) is located above the extending board (22) close to the first lateral end (211) to form an upper shifting gap (271) therebetween, and the lower shifting gap (261) and the upper shifting gap (271) have the same height which is 0.05 mm, thereby limiting the maximum deformation of the sensing block (21) and further protecting the tension controller (20) from damage.

In actual application, referring to FIGS. 1 to 5, the yarn (15) is wound on the winding wheel (13) of the yarn feeder (10) to form the yarn roll, and the elastic strips (14) are configured to abut against the inner periphery of the yarn roll. Thus, the winding wheel (13) driven by the driver (12) can directly drive the yarn roll to have synchronous rotation, which simplifies the structure of the yarn feeder (10) and improves the driving efficiency. Moreover, the yarn (15) is configured to sequentially and simultaneously couple with the lower portion of one grooved wheel (241), the upper portion of the tension pulley (231) and the lower portion of the other grooved wheel (241) to pass through the tension controller (20), so that the tension value of the yarn (15) can be obtained by the tension controller (20) when the tension pulley (231) is pressed downwardly. Meanwhile, the torsion value of the yarn feeder (10) corresponding the obtained tension value of the yarn (15) can be calculated by the electronic control board (251) of the tension controller (20). As a result, according to user's preset values from the control panel (252) and the calculated torsion value of the yarn feeder (10) from the electronic control board (251), the tension controller (20) can automatically and directly control the driver (12) to keep the torque or rotational speed of the yarn feeder (10) in a preferred value. Therefore, when a plurality of the yarn feeders (10) with the tension controllers (20) are cooperated to proceed the weaving processing, the preset tension controllers (20) can control the yarn feeders (10) to have the same torque or rotational speed so as to weave the yarns (15) on different yarn feeders (10) together under the same tension, thereby improving the weaving quality and yield.

Figure 6:
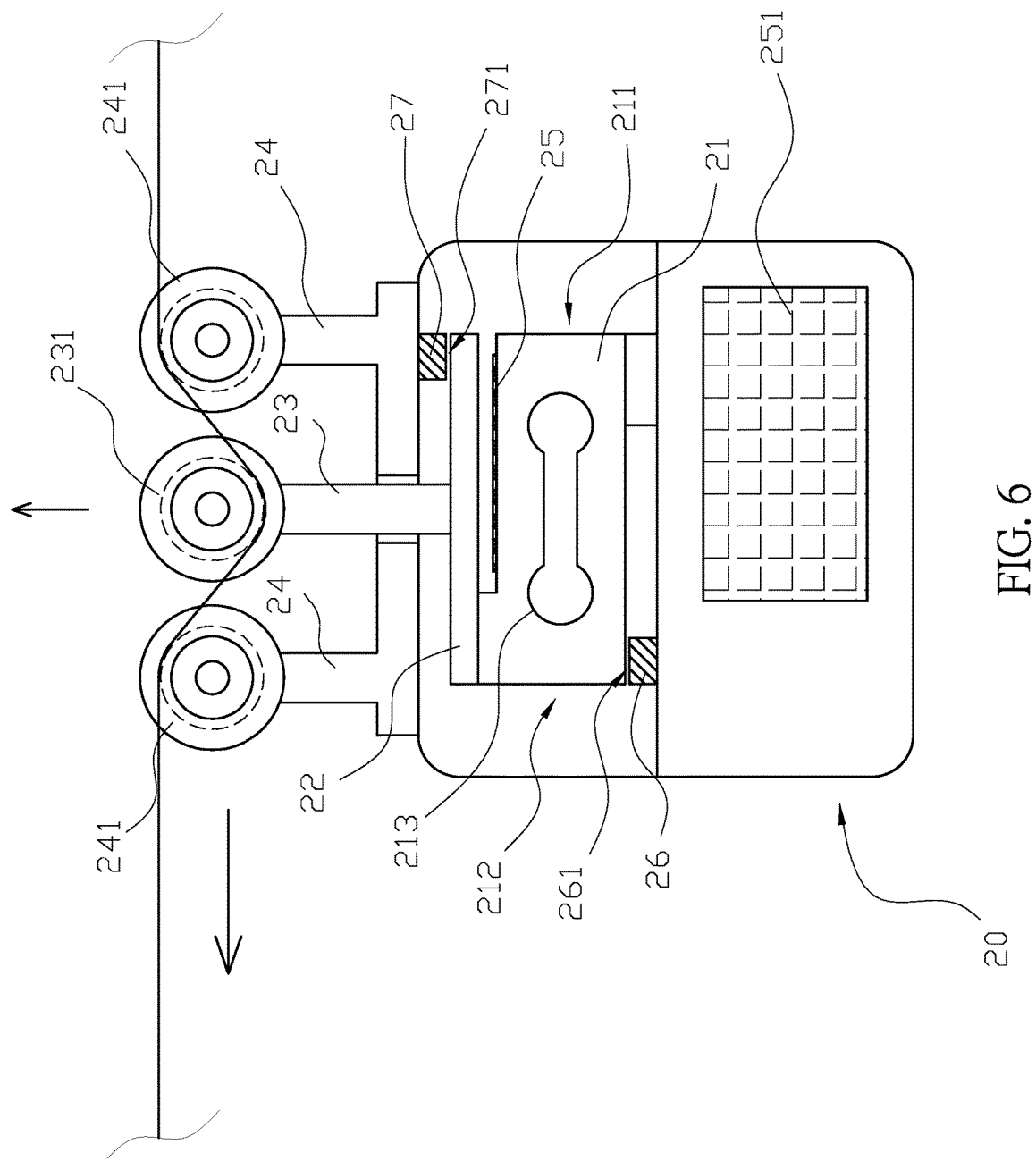
FIG. 6 is a schematic view of another embodiment of the sensing apparatus for yarn feeder of the present invention when in use.

Similarly, referring to FIG. 6, the yarn (15) can sequentially and simultaneously couple with an upper portion of one grooved wheel (241), a lower portion of the tension pulley (231) and an upper portion of the other grooved wheel (241) to pass through the tension controller (20), and the tension value of the yarn (15) can be obtained by the tension controller (20) when the tension pulley (231) is pressed upwardly.

More specifically, when the tension pulley (231) is pressed downwardly by the yarn (15), the operating rod (23) is driven to press the extending board (22) of the tension controller (20) and the sensing block (21) downwardly, leading to the deformation of the sensing block (21). The sensing block (21) can have stable deformation because of comprising the first lateral end (211) secured on the tension controller (20), the second lateral end (212) connected to the extending board (22) and the deformable hole (213). Additionally, the impedance sensing piece (25) attached on the surface of the sensing block (21) is configured to have synchronous deformation with the sensing block (21), and the deformation changes the electrical resistance of the impedance sensing piece (25). Thus, according to the variation of electrical resistance, the tension controller (20) can obtain the precise tension value of the yarn (15).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A sensing apparatus for yarn feeder comprising:
   a yarn feeder; and
   a tension controller having an elongated sensing block installed therein which comprises a first lateral end and a second lateral end, and the first lateral end secured on the tension controller to enable the second lateral end to be suspended; a horizontal extending board connected to an upper portion of the second lateral end at one end to enable the other end thereof to be suspended between the first lateral end and an upper end of the tension controller; an operating rod mounted on a middle upper surface of the extending board at one end and upwardly sticking out of the tension controller to pivotally connect to a tension pulley at the other end; a yarn, which is wound on a winding wheel of the yarn feeder, configured to couple with the tension pulley; at least an impedance sensing piece attached on a surface of the sensing block, and a deformable hole horizontally penetrating through the sensing block; when the tension pulley pressed or pulled by the yarn to drive the sensing block, the deformable hole configured to have slight deformation and the impedance sensing piece bent to enable the tension controller to obtain the tension value of the yarn and further calculate the torsion value of the yarn feeder; the tension controller further comprising a first locating block and a second locating block installed therein, and the first locating block located beneath the second lateral end of the sensing block to form a lower shifting gap therebetween while the second locating block located above the extending board close to the first lateral end to form an upper shifting gap therebetween, and the lower shifting gap and the upper shifting gap having the same height, thereby limiting the maximum deformation of the sensing block.

2. The sensing apparatus for yarn feeder of claim 1, wherein the tension controller further has two fixed rods respectively located at two lateral sides of the operating rod, and each of the fixed rods is pivotally connected to a grooved wheel, and the two grooved wheels are configured to guide the yarn to firmly couple with the tension pulley.

3. The sensing apparatus for yarn feeder of claim 1, wherein the lower shifting gap and the upper shifting gap have the same height which is 0.05 mm.

4. The sensing apparatus for yarn feeder of claim 1, wherein the impedance sensing piece of the tension controller is electrically connected to an electronic control board and a control panel which are configured to automatically control the rotational torque of the yarn feeder and to display the status of setting and control of the tension controller respectively.

5. The sensing apparatus for yarn feeder of claim 4, wherein the yarn feeder has a shaft axially penetrating through a driver and the winding wheel, and the driver and the winding wheel are connected to have rotation synchronously; the electronic control board is electrically connected to the driver.

6. The sensing apparatus for yarn feeder of claim 5, wherein a plurality of arc-shaped elastic strips are arranged around the winding wheel, and each of the elastic strips has two ends respectively connected to two ends of the winding wheel; the yarn is wound on the winding wheel to form a yarn roll, and the elastic strips are configured to abut against an inner periphery of the yarn roll.

* * * * *